United States Patent [19]
Noguchi

[11] 3,945,403
[45] Mar. 23, 1976

[54] TUBE CONSTRUCTION FOR FASTENER PROFILE STRIPS

[75] Inventor: Takashi Noguchi, Tokyo, Japan

[73] Assignee: Minigrip, Inc., Orangeburg, N.Y.

[22] Filed: Apr. 19, 1973

[21] Appl. No.: 352,459

[52] U.S. Cl. .................... 138/118; 138/172; 150/3; 264/95
[51] Int. Cl.² .................... B65D 33/30; F16L 11/10
[58] Field of Search .......... 138/128, 118, 172, 156; 150/3; 61/62; 264/95

[56] References Cited
UNITED STATES PATENTS

| | | | |
|---|---|---|---|
| 3,380,481 | 4/1968 | Kraus | 138/118 |
| 3,416,199 | 12/1968 | Imamura | 150/3 X |
| 3,462,068 | 8/1969 | Suominen | 150/3 X |
| 3,597,795 | 8/1971 | Naito | 264/95 |
| 3,685,562 | 8/1972 | Ausnit | 138/128 X |
| R26,991 | 11/1970 | Luca | 264/95 |

Primary Examiner—Richard C. Queisser
Assistant Examiner—Daniel M. Yasich
Attorney, Agent, or Firm—Hill, Gross, Simpson, Van Santen, Steadman, Chiara & Simpson

[57] ABSTRACT

A tube construction for providing releasably interlocking fastener strips to be attached to the surface of film for bags including an elongate thin plastic tube having a range of gauges from 0.0015 inch to 0.005 inch with at least six shaped plastic profiles projecting from the surface of the tube and integral therewith being formed by the same extrusion process with one-half of the number of profiles being female and the other half being male profiles, and the male and female profiles shaped and sized so as to be capable of releasably interlocking with each other and with the film between the profiles having a distance no greater than 2 inches, and said film being longitudinally severable between profiles to provide fastener strips for laminating onto the surface of a plastic film to be converted into reclosable plastic bags.

9 Claims, 10 Drawing Figures

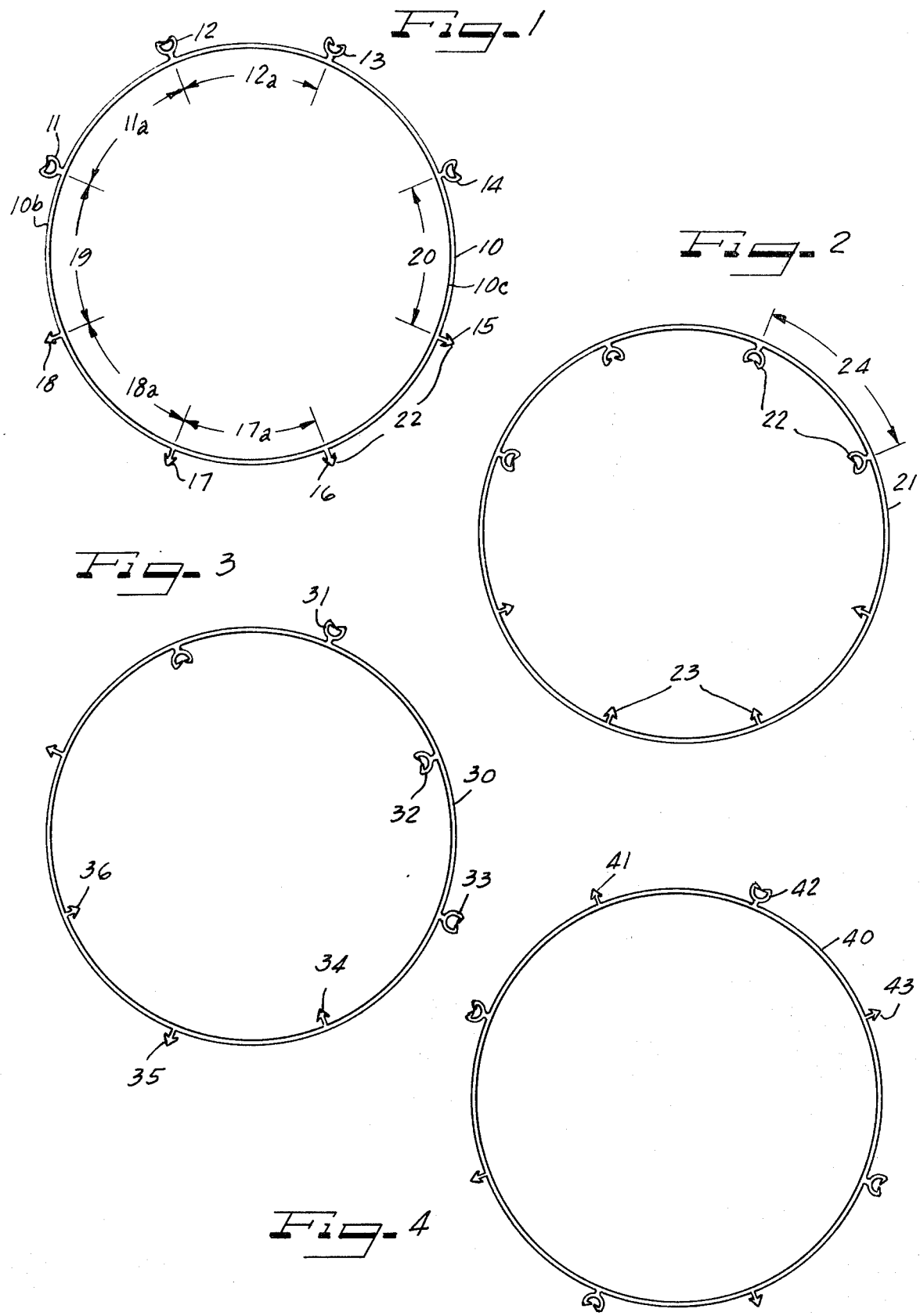

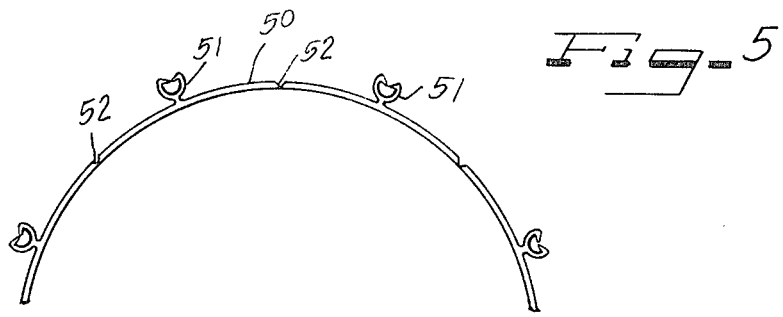
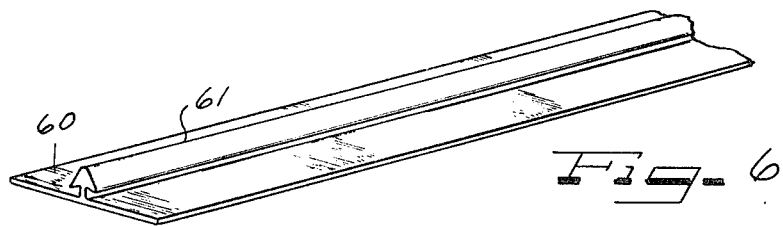
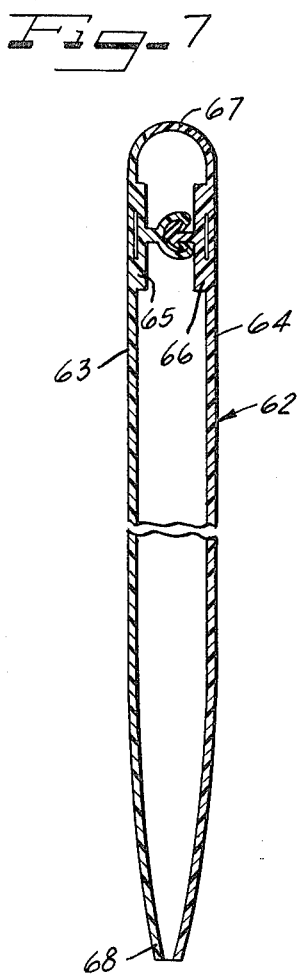
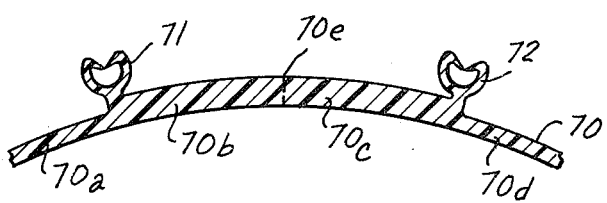
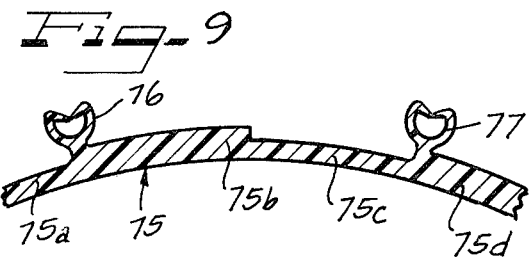

TUBE CONSTRUCTION FOR FASTENER PROFILE STRIPS

BACKGROUND OF THE INVENTION

The present invention relates to improvements in fastener profile structures for plastic bags of the type which are reclosable.

More particularly, this type of bag is formed of thin plastic film of a suitable physical characteristic for containing products. Frequently, the bag will be of thin, lightweight tough material which is clear so that the contents can be seen with the bag fully sealed so that the contents are protected against dust and moisture. The bag is opened by being cut or torn at the top for access to the contents. If a reusable bag is desired, it has releasably interlocking fastener profiles provided on the inner facing surfaces near the top of the bag. These profiles permit the bag to be opened by pulling the top lips apart. The bag can be reclosed by applying a closing pressure along the profiles.

This type of bag is sufficiently inexpensive so that it does not add significantly to the cost of the product, and yet provides a container which is of use for carrying the product for some time thereafer or is reusable for other products. This makes the bag particularly valuable to the purchaser and increases the merchandisable attractiveness of the product.

To provide such an improved bag at a reduced cost, it has been discovered that certain fastener profiles can be carried on fastener strips which are laminated or attached by heat and pressure to the surface of a film which is then converted into a bag with the fastener strips located at the inside and near the top of the bag. With this construction, the strips can be formed of optimum material for the fastener profiles, and the bag can be made of material chosen independent of the requirements of the fastener strips. For example, a thin flexible plastic bag may be provided of a very clear plastic, and a more rigid slippery material can be used for the fastener strips of optimum physical characteristics for the interlocking profiles. Such profiles will interlock with a strength which equals the strength of the bag, and yet can be readily openable when desired by pulling apart the bag's top flanges of lips.

To be compatible with a flexible plastic bag, the fastener strips of this type must be capable of being inexpensively manufactured and must be available in a form so that they can be attached rapidly to a plurality of bags in an assembly line arrangement. If the fastener strips are expensive to make, or inconvenient to handle so that they are expensive to assemble, the advantage of a low cost plastic bag is defeated, and the commercial attractiveness of this type of prou..ct is lost.

It has heretofore been customary to form certain fastener strips by extruding them individually from a die which is shaped to form a planar web p- .tion with a shaped profile on the surface. Also, this specific type of fastener consists of separate female and male profiles which interlock when pressed together, as illustrated in the attached drawings. The web portion is flat, and the profile is usually centrally located. In this type of extrusion, the resistance within the die will tend to pull unequally so that frequently there is a holding back of the web portion on one side or the other of the profile. This tends to cause cocking and distortion of the male or female profile and wrinkling of the fastener web. It will be apparent that it is critically important that the profile retain a perfect shape and retain the dimension which has been determined for it so that it will interlock with full strength with its mating profile.

The present invention extrudes a plurality of male and female fastener strips at least six in number, in a single extrusion, so that the web portions of the strip are each attached to each other, or in other words, form a tube. This eliminates the unequalness which is encountered with the extrusion of a single flat strip, and the pulling and web wrinkling which occur with the single strip are eliminated.

Another advantage obtained in extruding the plurality of strips joined together in a single tube is that the web portion of the strip can be made thinner. There is a minimum limit to the web thickness which can be extruded when a flat single strip fastener is made because the web will tear and not extrude if the opening gets too small, or if the fastener is drawn down too much in order to reduce its size. However, by extruding the plurality of strips in tube form, the web can be thinned down by inflation of the tube to stretch it to a thinness less than the die opening. This inflation will occur without reducing the size of the profile since inflation of the tube will only reduce the size of the web which supports the profile. In this manner a fastener strip can be made having a web of a thickness which is the same as the bag so that the web can be heat sealed to the surface of the bag without damage to the bag material. If an attempt is made to seal a fastener strip having a thick web to a thin bag, enough heat must be added to melt the plastic of the strip, and this heat usually will be too much for a thin bag film and will result in melting holes in the bag wall. With the fastener strip and bag film of substantially equal thickness, enough heat is added to soften the plastic of both the film and the strip an equal amount, and this accomplishes a satisfactory seal without resulting in holes in the bag film.

A still further advantage of the formation of the male and female profile strips in tube form is that a greater speed of extrusion can occur as contrasted with single flat strip extrusion of these profiles. Limitations are inherent in a single flat strip extrusion because the high speeds result in wrinkling and distortion which do not occur in tube extrusion.

A still further advantage of the present invention is that smaller male and female profiles can be made. Limitations in drawdown tend to limit the size of the profile in the extrusion of a flat single strip.

Also, in a flat extrusion process the more single profile strips that are made at one time, the more difficult the extrusion becomes since each additional profile strip merely multiplies the problems encountered with a single profile strip. A circular multiple profile joined profile strip, however, tends to balance the profiles against each other, thereby reducing the difficultly of the multiple profile extrusion.

It is accordingly an object of the invention to provide an improved mechanism and method for the production of male and female profile strips of the type illustrated for attaching to plastic film for conversion into bags wherein improved control and cooling are achieved for a resultant improved profile shape and size.

A further object of the invention is to provide an improved mechanism and method for providing male and female profile strips wherein a thinner web portion can be obtained and wherein wrinkling and distortion of the web and edges of the profile are eliminated.

A further object of the invention is to provide a method and mechanism for extruding male and female fastener profile strips at higher rates of speed than heretofore obtainable in a conventional single flat strip extrusion process.

It is accordingly an object of the present invention to provide an improved male and female fastener strip structure of the type illustrated by a more rapid less expensive procedure wherein the material is particularly easy to handle for use in assembly with film for conversion into bags and wherein the strips are laminated onto the surface of the film of the bags.

Another object of the invention is to provide an improved male and female fastener strip structure which does not have the distortions and other disadvantages which occur from nonuniform cooling.

Other objects and advantages, as well as equivalent structures and methods which are intended to be covered hereby, will become more apparent to those versed in the art with the teaching of the principles of the invention in connection with the disclosure of the preferred embodiments thereof in the specification, claims and drawings in which:

DESCRIPTION OF THE DRAWINGS

FIG. 1 is a sectional view of a fastener strip tube with a section being taken transversely of the length of the tube;

FIG. 2 is another sectional view similar to FIG. 1 of another embodiment of the invention;

FIG. 3 is a sectional view of another embodiment of the invention;

FIG. 4 is a sectional view of still another embodiment of the invention;

FIG. 5 is a fragmentary sectional view of a further arrangement of the invention;

FIG. 6 is a fragmentary perspective view of a strip formed from one of the tubes of the previous figures;

FIG. 7 is a sectional view of a bag with the strips made from the structures illustrated;

FIG. 8 is a fragmentary sectional view of another form of the invention;

FIG. 9 is a fragmentary sectional view of still another form; and

FIG. 10 is a fragmentary perspective view of a female fastener strip.

DESCRIPTION OF THE PREFERRED EMBODIMENTS

FIG. 1 illustrates an elongate thin plastic tube 10 formed of a film of plastic such as polyethylene or polypropylene or a like material. The thin plastic is formed by being extruded from an annular die, and the heated plastic passes out through an annular die opening and is cooled by air directed along the inner and outer surfaces and may be cooled in liquid. Frequently, inflation is done to aid in grain orientation of the plastic and decrease the film thickness.

In extrusion processes heretofore available wherein single web male and female profile strips were extruded, it was necessary to cool the strips in a water bath. With the present arrangement by extruding a tube, air cooling can be employed, or a combination of both can also be used. Since, in effect, each adjacent profile strip controls the position and cooling of the other profile strip when the strips are continuous in a tube, the distortion which can occur with a single strip is avoided. Also, since the profiles are uniformly spaced from each other around the tube, there is an equal length of film between each of them so that any conduction of heat away from the profiles on each side is uniform. If a single strip is made with the profile not centered on the strip, the narrower portion of the strip at one side of the profile will tend to cool more rapidly than on the other side. This is not the case with strips formed in a continuous tube because the amount of film on each side of the profile is determined only at the time of cutting the strip from the tube, which is after the cooling of the tube.

The thin plastic film between the profiles which after cutting becomes the profile webs has a thickness in the range of 0.0015 to 0.005. A maximum profile size is approximately 75 mils. The range of the ratio of profile size to web thickness is in the range of 40:1 to 25:1. The web size is the measured thickness of the web, and the profile size is measured from the base of the profile to its tip, that is, from the base of the film to which the male element is attached to its highest point or the tip of its arrow shape.

The spacing between profiles is no greater than 2. This provides strips which have sufficient spacing so that when cut, yield strips for attachment to the bags, on one side of the profile and opening lips to separate the interlocked profiles on the other side of the profile. The film tube has a number of female profiles, shown at 11, 12, 13 and 14, and an equal number of male profiles, shown at 15, 16, 17 and 18. The profiles have a size and shape so that the male profiles will releasably interlock with the female profiles. While different sets of male and female profiles may be provided, preferably the male profiles are of the same size, and the female profiles are similarly of the same size so that they may be interchangeable, and care does not have to be taken when assembling the strips onto a bag so that corresponding male and female profile strips are used.

The female profiles are arranged on one-half of the circumference of the tube, that is, in the area extending from 10*b* to 10*c*. The male profiles are on the other one-half of the circumference.

The spacing between each of the female profiles on their one-half the circumference is equal. That is, spaces 11*a* and 12*a* are substantially identical. Similarly, the spacing between the male profiles, such as 17*a* and 18*a*, are equal. Spacing between the end profiles between each said one-half circumference is the same as the space between adjacent profiles. That is, the spaces 19 and 20 between the groups of profiles are the same as spaces 11*a*, 12*a* or spaces 17*a* and 18*a*. Essentially, therefore, the spacing between each profile and its neighboring profile is the same.

In the arrangement shown in FIG. 2, the profiles are arranged on the inner surface of the tube, instead of on the outer surface as was the case in FIG. 1. The tube is shown at 21 with female profiles such as 22 arranged on one-half of the tube circumference. Male profiles such as 23 are arranged on the other one-half. The spacing, such as 24 between each of the female profiles is identical, and the spacing between each of the male profiles is the same, and similarly the spacing between the two groups is the same. Thus, when the tube is slit for assembly of strips onto a bag, there is no waste of material, and if the strips are cut midway between the profiles, strips of equal size will result.

The illustrations show tubes with eight profiles thereon. However, in accordance with the principles of the invention, it has been found that using less than six profiles is not advantageous, though larger numbers can be used depending upon the capacity of the die and the width of strips needed.

In arrangement of FIG. 3, the profiles are situated so that they are in alternate locations with one profile on the outer surface and an adjacent profile on the inner surface of the tube. The tube is shown at 30, and female profiles such as 31, 32 and 33 alternate on the outer and inner surfaces of the tube. Similarly, male profiles 34, 35 and 36 alternate on the inner and outer surfaces of the tube.

FIG. 4 shows a tube 40 with profiles all on the same surface, but the profiles are structured so that they will be alternate in design. Thus, adjacent profiles 41, 42 and 43 alternate as male, female and male for the full periphery of the tube.

FIG. 5 shows an arrangement wherein the tube 50 has profiles 51 on the surface, and tear lines 52 of weakened resistance are situated between each of the profiles. These tear lines permit strips to be torn out of the length of the tube, or permit the tube to be separated into a plurality of strips in a single act after cooling. This eliminates the need for shearing or severing along the length of the tube.

A profile strip such as the type used is shown in FIG. 6 with its web at 60 and with a male arrow shaped profile 61 on its surface. A typical female profile strip 80 having a groove 81 to receive and to interlock with the male profile 61 is shown in FIG. 10.

FIG. 7 illustrates a bag with the profile strips in place. The thin film bag is shown at 62 with side walls 63 and 64. The bag may be originally arranged to be open at the top or the bottom, but is shown with a doubled top 67 and separated bottom edges at 68 for filling. The film from which the bag is made will have first been laid flat, and the strips 65 and 66 continuously laminated by heat and pressure to the surfaces of the bag film. Thereafter the bag is formed by cross seals. The said lamination may be over the entire surface of the strips, but preferably is along continuous areas at each side of the profiles. The profiles are then interlocked. When the bag is used, it is severed at the top along 67, and the flanges or lips are gripped to forcibly pull apart the profiles. When the bag is to be reclosed, opposing pressure is applied such as between the thumb and forefinger, and this will interlock the profiles.

FIGS. 8 and 9 show alternate arrangements which provide heavier material at one side of the profile than the other. This heavier material is present so that it will project above the profile toward the top of the bag and provide a reinforced lip for gripping and opening the bag.

In FIG. 8 a tube 70 is shown with profiles 71 and 72 thereon. At one side of the profile 71, the film material 70a is thinner that at the other side 70b.

For the profile 72, the film at one side 70d is thinner than the film 70c at the other side. When the strips are separated, they are cut along the line 70e, and the strips are placed on the bag so that the portions 70b and 70c will extend upright.

FIG. 9 shows an arrangement wherein the tube 75 has profiles 76 and 77. The material at one side of the profile 75a is thinner than at the other side 75b. For the profile 77, the material 75c is thinner than at the other side 75d. This provides a staggered arrangement for the film thickness, and provides strips which can be oriented on the same side of the bag wall surface.

I claim as my invention:

1. A tube construction for releasably interlocking fastener profile strips to be attached to the surface of film material for bags comprising:
   an elongate plastic tube having a plurality of fastener profiles thereon;
   said profiles of the profile strips being complementary shaped with an equal number of female profiles and male profiles;
   said profiles having a size and shape so that the male profiles will releasably interlock with the female profiles;
   said profiles being arranged on the surfaces of the tube construction in two groups with the male profiles being on one-half of the circumference of the tube and the female profiles being on the remaining one-half of the circumference;
   the spacing distance between adjacent profiles on each one-half circumference being equal;
   the film material on either side of each profile being of different thickness to provide reinforcement therefore;
   the spacing distance between end profiles between each said one-half circumference being the same as the spacing between adjacent profiles.

2. A tube construction for releasably interlocking fastener strips to be attached to the surface of material for bags in accordance with claim 1:
   wherein the film thickness between the profiles is in the range of 0.0015 to 0.005 and the spacing distance between adjacent profiles is no greater than 2.

3. A tube construction for releasably interlocking fastener strips to be attached to the surface of material for bags comprising in combination:
   an elongate thin plastic tube having a thickness in the range of 0.0015 to 0.005 inch;
   at least six shaped plastic profiles projecting from the surface of the tube and integral with the tube with one-half of the profiles being male profiles and the other one-half being female profiles and with said male and female profiles shaped and sized to be releasably interlocked with each other;
   the film material on either side of each profile being of different thickness to provide reinforcement therefore;
   the spacing between the profiles being no greater than 2 inches and said film being longitudinally severable between each profile to provide fastener strips for laminating onto the surface of the plastic bag.

4. A tube construction for releasably interlocking fastener strips to be attached to the surface of material for bags constructed in accordance with claim 3:
   wherein said profiles project from the inner surface of said tube.

5. A tube construction for releasably interlocking fastener strips to be attached to the surface of material for bags constructed in accordance with claim 3:
   wherein said profiles project from the outer surface of said tube.

6. A tube construction for releasably interlocking fastener strips to be attached to the surface of material for bags constructed in accordance with claim 3:
   wherein the position of said profiles is alternated with the first profile being on the outer surface of the film and the next profile being on the inner surface.

7. A tube construction for releasably interlocking fastener strips to be attached to the surface of material for bags constructed in accordance with claim 3.
  wherein all of the profiles are on the same surface of the tube and said plastic profiles are alternated with each male profile having adjacent female profiles.

8. A tube construction for releasably interlocking fastener strips to be attached to the surface of material for bags constructed in accordance with claim 3:
  wherein a tear line of weakened resistance is positioned in the film between each of the profiles.

9. A tube construction for releasably interlocking fastener strips to be attached to the surface of material for bags constructed in accordance with claim 3:
  wherein the film material at one side of each of the profiles has a predetermined thickness and the film material at the other side of the profiles is heavier so that the heavier film provides a gripping area for manually separating the fastener strips on a bag to which the strips are attached.

* * * * *